Oct. 8, 1929.    W. A. GEIGER    1,730,500
FRICTION SHOCK ABSORBING MECHANISM AND PROCESS OF FITTING PARTS
Filed Dec. 21, 1923
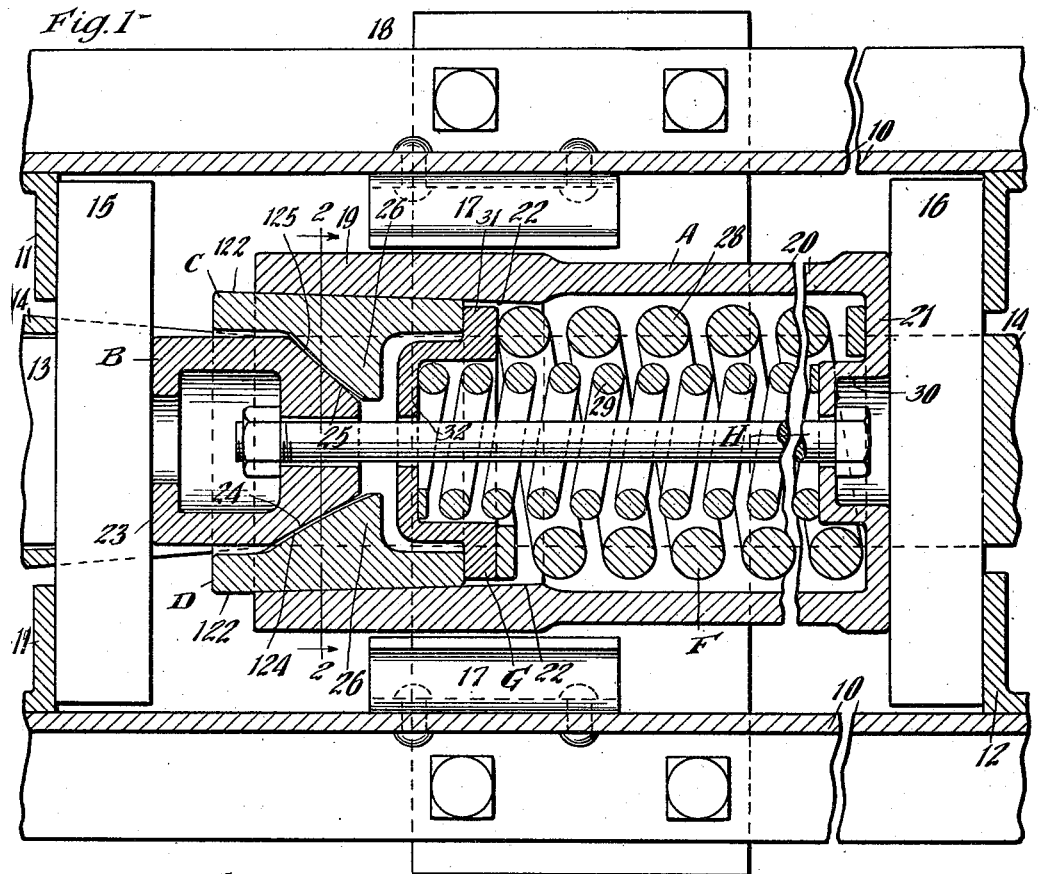
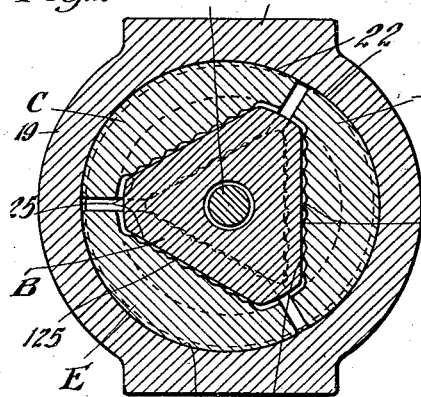
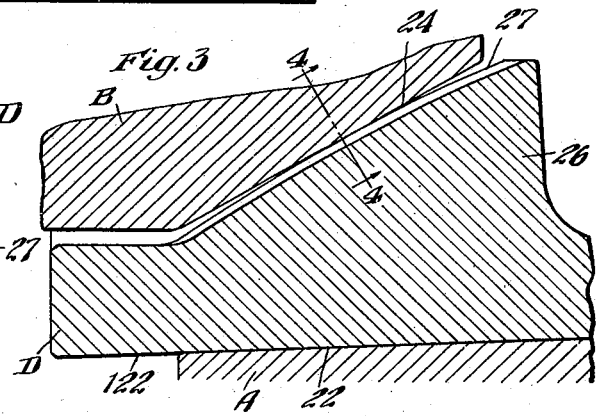
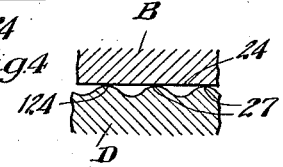
Witnesses
Hans M. Rachlitz
Inventor
William A. Geiger
By George I. Haight
His Atty.

Patented Oct. 8, 1929

1,730,500

UNITED STATES PATENT OFFICE

WILLIAM A. GEIGER, OF CHICAGO, ILLINOIS, ASSIGNOR, BY MESNE ASSIGNMENTS, TO W. H. MINER, INC., A CORPORATION OF DELAWARE

FRICTION SHOCK-ABSORBING MECHANISM AND PROCESS OF FITTING PARTS

Application filed December 21, 1923. Serial No. 681,928.

This invention relates to improvements in friction shock absorbing mechanisms, and process of fitting parts.

More specifically, the invention relates to such mechanisms wherein are employed a wedge friction system including a wedging means and a plurality of friction shoes coacting with a friction shell.

As is well known to those skilled in the art, in the manufacture of shock absorbing mechanisms for draft riggings, machine finishing operations are very seldom resorted to on account of the increased expense which would be involved. In those shock absorbing mechanisms employing a friction shell, a plurality of friction shoes arranged in a circular series within a shell and a pressure transmitting member, it is the usual practice to make the shell as a casting without any machine finishing operation; to make the pressure transmitting wedge member as a casting; and to dropforge the friction shoes, and in the case of the latter elements, accurate results are obtainable. In the case of the wedge pressure transmitting member having flat or plane wedge faces, the faces can be easily ground to remove slight irregularities arising through the casting operation. In the case of the interior of the cylinder, machining is relatively difficult and too expensive to receive practical consideration and therefore the accuracy of manufacture of the friction shell is dependent upon the molding and casting without other appreciable finishing. In foundry operations, certain working variations must be allowed for in commercial practice.

Furthermore, in a friction device of the character indicated in the preceding, it is essential that true full contact be had on all cooperating friction surfaces and also on the wedge faces. Due to the unavoidable and necessarily allowable foundry variations which occur in common commercial practice, it has heretofore been found that proper contact of all the sets of surfaces just referred to cannot always be insured, with the result that the devices do not function as efficiently as they should.

One object of my invention is to provide a very simple expedient which does not involve any increased expense in the cost of manufacture and by which adjustments of parts within the limits of variations necessitated by commercial manufacture can be had to positively insure the proper and intended full surface contact of all the cooperating engaging sets of faces.

A more specific object of the invention is to provide in that type of friction mechanism having a friction shell of generally cylindrical form, a circularly arranged series of friction shoes and a centrally disposed pressure transmitting wedge, means for insuring flat surface contact between the pressure transmitting wedge and the cooperating faces of the shoes, while allowing for those variations in the friction surfaces of the shell which are necessitated by commercial practice.

A still further object of the invention is to provide a process or method by which the contacting surface of the pressure transmitting wedge and the shoes of a mechanism of the character hereinbefore referred to, will be brought into true flat surface engagement with each other after a very few actuations after the parts have been assembled, whereby the permitted foundry variations in commercial practice will be automatically compensated for.

My invention further consists in the improvements in the parts and devices, the novel combination of the parts and devices, and the novel steps of the process as hereinafter described and made subject matter of the claims.

Other objects and advantages of the invention will more clearly appear from the description and claims hereinafter following.

In the drawing, forming a part of this specification, Figure 1 is a longitudinal, sectional view of a portion of a railway draft rigging, the section through the shell and friction elements therewithin corresponding to two section planes at 120° apart. Figure 2 is a vertical, transverse, sectional view corresponding substantially to the line 2—2 of Figure 1. Figure 3 is a longtitudinal, sectional view on an enlarged scale, of a wedge shoe and portions of the friction shell and main wedge. And Figure 4 is a transverse, sectional view corresponding substantially to the line 4—4 of Figure 3.

In said drawing, 10—10 denote channel shaped draft or center sills of a railway car, to the inner faces of which are secured front stop lugs 11 and rear stop lugs 12. A portion of the drawbar is indicated at 13, the same having operatively associated therewith a hooded yoke 14 within which is disposed the shock absorbing mechanism proper, hereinafter described, a front main follower 15 and a rear main follower 16. The friction shock absorbing mechanism proper, illustrated in the drawing, is of that type employing a substantially cylindrical shell and cage, and in order that it be maintained in proper central position, the draft sills have secured to the inner faces thereof, guide plates 17—17. The yoke and the parts contained therein are supported in operative position by a detachable saddle plate 18.

The improved shock absorbing mechanism proper, as shown, comprises broadly, a combined friction shell and spring cage casing A; a pressure transmitting wedge B; three friction shoes, C, D and E; a spring resistance F; a spring follower or cap G; and a retainer bolt H.

The casting A is of generally cylindrical form having the friction shell proper 19 thereof open at the front end. The casting provides a cylindrical spring cage or casing 20, and at its rear end the casting A has an integral, transverse wall 21 bearing on the follower 16. The friction shell proper 19 is preferably of the following formation, as best illustrated in Figures 1 and 2. The interior of the shell 19, while of generally cylindrical contour, is preferably comprised of three, true cylindrical surfaces 22—22 symmetrically arranged about the axis and of approximately 120° extent each. The cylindrical surface 22—22 are converged inwardly of the shell on a relatively slight taper and in such a manner that the inner ends of the three said cylindrical surfaces merge into a true circle. With this arrangement, the friction shoes, which have true cylindrical surfaces as hereinafter described, will maintain true surface contact as distinguished from line contact with the shell at all positions during a compression stroke.

The wedge B, through which the pressure is transmitted, is in the form of a hollow casting having a front, transverse bearing face 23 engaging the front follower 15. At its inner end, the wedge B is provided with a true wedge face 24 and two other rearwardly converging inclined faces 25—25, all of the faces 24 and 25 being disposed around the center or axis of the wedge, the wedge having the appearance of a truncated, somewhat irregular, triangular pyramid.

The three friction shoes C, D and E, preferably in the form of drop forgings, are of like construction, each having an outer friction surface 122 which corresponds to a portion of a true cylindrical surface and which extends through an arc of approximately 120°. On its inner side, the side nearest the axis of the shell, each of the shoes C, D and E is provided with a lateral enlargement 26. The enlargement 26 of the shoe D is provided on the front side with a longitudinally convexed wedge face 124 coacting with the true wedge face 24 of the wedge B. As clearly shown in the drawing, attention being especially called to Figure 4, the faces 124 of the shoe D is provided with a plurality of ridges 27 extending longitudinally of the shoe. The enlargement 26 of each of the shoes C and E is provided on the front side thereof with a rearwardly and inwardly inclined, longitudinally convex face 125 cooperating with one of the inclined faces 25, as clearly shown in Figures 1 and 2. The faces 125 of the shoes C and E are provided with similar ridges 27 extending longitudinally thereof and functioning in a manner similar to the ridges 27 of the shoe D. The ridges 27 of the faces 124 and 125 of the shoes D, C and E present a serrated surface, the high portions of the ridges of which contact with the surfaces 24 and 25 of the wedge, there being theoretically, contact between said surfaces at spaced points only. Upon compression of the mechanism, the ridges 27 will quickly flatten down or be upset, and as soon as the device is compressed once, the point contact will immediately be widened into surface contact of appreciable width and also length. The faces 124 and 125 of the shoes are so disposed that the front ends of the shoes will normally lie approximately flush with each other and project a short distance outside of the end of the shell. As clearly shown in Figure 3, the faces 124 and 125 of the wedge faces are only slightly convex, being curved longitudinally on an arc of relatively great radius for a purpose hereinafter described.

The spring resistance F, as shown, comprises an outer heavy coil 28 bearing at its inner end against the wall 21 of the casting A and an inner coil 29 bearing at its inner end upon a hollow cup-like boss 30 formed integral with the wall 21.

The spring follower G, which is of generally cup shape, is provided with an annular flange 31 on the inner side of which is adapted to bear the front end of the outer coil 28. The spring follower has an outwardly extended, integral cup section 32, the interior of which provides a bearing for the front end of the inner coil 29.

The retainer bolt is anchored at its rear end within the boss 30 and at its forward end within the wedge B, the latter and the spring follower G being suitably apertured to accommodate the shank of the bolt. The bolt not only serves to maintain the parts assembled but is also utilized to adjust the gear to proper over-all length, to maintain the parts in this position when under full release and to place the spring under initial compression to compensate for wear.

Assuming a buffing or compressing action applied to the draft rigging, the general operation of the mechanism is as follows, detailed consideration of the cooperating flat, inclined and serrated, convex, inclined faces being omitted at this time. As the wedge B is forced inwardly of the shell, there will be initially a slight movement of the wedge inwardly with respect to the keen angle shoe D, due to the inertia of the shoes and the fact that on account of the relatively keen angle, slippage of the faces 24 and 124 is possible. During this initial action, the two blunt angle shoes C and E will move longitudinally inwardly of the shell substantially in unison with the wedge B on account of the relatively non-wedging angle of the cooperating faces 25 and 125, thus advancing the shoes C and E longitudinally slightly ahead of the keen angle shoe D. The foregoing initial action sets up the desired pronounced spreading action. As the parts continue their movement inwardly of the shell, there is substantially no further slippage between the keen angle faces 24 and 124, but due to the taper of the shell surfaces, there must be a relative approach of the shoes, which is permitted by the shoes C and E moving radially inwardly with respect to the wedge B, the slippage taking place on the blunt angle faces 25 and 125 which act in the nature of a safety valve for this purpose. This differential action also advances the shoes C and E longitudinally ahead of the shoe D and the action so continues until the end of the compression stroke. During the compression stroke just described, and due to the advance of the shoes C and E relatively to the shoe D, the spring cap or follower G will be displaced or removed from the inner end of the shoe D. As the contact existing between the ends of the two blunt angle shoes C and E with the flange 31 of the cap G is appreciably more than half of the circumference of the spring cap flange 31, the spring cap is maintained in its proper position by the two shoes C and E advancing together in unison, that is, the cap is maintained at right angles to the axis of the mechanism, without any possibility of the same being tilted by the pressure of the spring. Although the cap G is out of engagement with the inner end of the keen angle shoe D during the compression stroke, it will be apparent that the shoe D always affords resistance because of the friction existing between the surface 122 thereof and the shell surface 22, this friction acting to retard the shoe D with gradually increasing force during the compression stroke. The friction shell being of metal, preferably malleable iron, it is capable of a limited amount of radial expansion which takes place during the compression stroke of the mechanism.

Upon removal of the actuating or compressing force, there is an initial releasing action induced by the lateral inward contraction of the shell. This contraction produces a relative approach toward the center line of the mechanism of the three shoes and this in turn causes the pressure transmitting wedge B to be squeezed out from between the shoes, this action being facilitated by reason of the blunt angle faces 25 and 125 on the wedge and blunt shoes respectively, the faces 25 and 125 acting as true wedge faces with respect to the radially inward contracting forces. The initial action just described results in loosening the wedge B sufficiently to permit the reduction of pressure between the friction surfaces of the various shoes and the shell friction surfaces, whereupon the spring becomes effective to commence moving all of the friction elements outwardly of the shell. At the beginning of the outward movement, the spring cap or follower G will move the two blunt angle shoes C and E in an outward direction, which in turn pick up the wedge B sufficiently to loosen the keen angled wedge faces 24 and 124 so that immediately thereafter the spring follower cap G will pick up the keen angled shoe and also move it outwardly. The retainer bolt H limits the outward movement of the wedge B, whereupon the three shoes will be forced to their normal position with their inner ends flush as shown in Figure 1.

Referring now more specifically to the operation and functioning of the flat surfaces and serrated, convex surfaces of the pressure transmitting wedge and shoes. In commercial practice, a foundry variation of two degrees in the taper of the shell friction surfaces in a device of the kind disclosed is permitted. In carrying out my invention, the radius of curvature of the convexed surfaces 124 and 125 is made relatively long, being of such a length that they will accommodate variations within the two degrees above referred to, that is, assuming the maximum variation in one direction, contact will be insured between the curved surface 124 and the flat surface 24 and between the curved surface 125 and the flat surface 25 near the inner ends thereof. Assuming the limit of variation in the opposite direction, contact will be insured between the curved surface 124 and the flat surface 24 and between the curved surfaces 125 and the flat surface 25 near their outer ends. A shell formed with the friction surface tapered accurately as designed will insure contact at the centers of the curved surfaces 124 and 125 and the flat surfaces 24 and 25 respectively; and variations intermediate the points referred to will insure contact between the extreme limits mentioned. When the parts are assembled, there will theoretically be contact only at spaced points on a transverse line between each set of surfaces 124 and 24 and 125 and 25, but as soon as the device is compressed once, this theoretical spaced point contact will immediately be widened and lengthened into a surface contact of appreciable width and length, and as two, three or four additional compressions of the mechanism occur, the area of contact is correspondingly increased until a sufficiently big enough area is obtained to insure the proper functioning of the parts. This process of fitting the parts to compensate for permissible foundry variations can obviously be accomplished in the usual test of the gear before being shipped and applied to the car and involves no increase in the cost of manufacture over the heretofore common practice.

From the foregoing, it will be observed that my improvements permit of automatic compensation of the parts even though the variation in inclination of one shell friction surface 22 may differ from the variation found in any other friction surface 22. It will also be obvious that no increase in the cost of manufacture of any of the parts, as compared with a device of similar type, is involved, and actual practice has demonstrated that the parts will automatically adjust themselves and produce the desired results as above indicated.

While I have herein shown and described the ridges on the wedge faces of the shoes as disposed longitudinally of the same, it will be obvious that similar results can be obtained by arranging the ridges transversely, diagonally or in any other direction. It will also be evident that the location of the convex faces may be reversed, that is, that the wedge may be formed with the convex surfaces, leaving the inclined faces of the shoe flat, and that either the convex or flat faces or all of these surfaces may be serrated.

While I have herein shown and described my improvements as employed with a casting of substantially cylindrical form throughout, nevertheless it will be appreciated by those skilled in the art that the invention is capable of utilization in friction mechanisms of other types and also that various changes and modifications may be made in certain details of construction without in any way departing from the spirit of the invention. All changes, modifications and variations are contemplated which come within the scope of the claims appended hereto.

I claim:

1. In a friction shock absorbing mechanism, the combination with a friction shell having interior friction surfaces; of a plurality of friction shoes within and cooperating with said shell; a spring resistance; and spreader means cooperable with said shoes, said spreader means and shoes having coacting pairs of faces inclined to the axis of the mechanism, one face of each pair being flat and the other serrated.

2. In a friction shock absorbing mechanism, the combination with a friction member having a longitudinally extending friction surface; of a spring resistance; a friction shoe having a friction surface cooperable with said friction surface of said member, said shoe having on the opposite side thereof a face inclined with respect to the line of applied force; and a member through which the actuating force is adapted to be transmitted to said shoe, said member having a face contacting with said inclined face of the shoe, one of said contacting faces having, as initially made and assembled with the other parts of the mechanism, a plurality of protrusions adapted to bear on the coacting face, said protrusions being adapted to flatten out, after the parts have assumed a predetermined relative position, to effect true surface contact thereof.

3. In a friction shock absorbing mechanism, the combination with a friction member having a longitudinally extending friction surface; of a spring resistance; a friction shoe having a friction surface cooperable with said friction surface of said member, said shoe having on the opposite side thereof a face inclined with respect to the line of applied force; and a member through which the actuating force is adapted to be transmitted to said shoe, said member having a face contacting with said inclined face of the shoe, one of said contacting faces having, as initially made and assembled with the other parts of the mechanism, a plurality of raised portions adapted to bear on the coacting face, one of said raised portions projecting to a greater extent than the remainder to thereby permit relative adjustment between said shoes and member to compensate for variations within predetermined limits.

4. In a friction shock absorbing mechanism, the combination with a friction shell having an interior, longitudinally extending friction surface; of a spring resistance; a friction shoe cooperable with the friction surface of said shell, said shoe having on its inner side a face inclined inwardly and toward the center of the shell; and a member through which the actuating pressure is transmitted to said shoe and having a corresponding contacting face, one of said contacting faces being slightly indented, initially, producing restricted contact between said faces to compensate for variations within predetermined limits by flattening out of said indented surface upon actuations of said mechanisms to thereby increase the area of contact of said surfaces.

5. The herein described process of insuring proper fitting of the parts of a friction shock absorbing mechanism, including the following steps: forming a friction member having a friction surface; forming a friction shoe element adapted to co-operate therewith; forming an element through which the actuating pressure is transmitted to the shoe; providing on one of said elements an engaging surface elevated at a plurality of spaced points; assembling said member and elements with the remaining parts of the mechanism and with at least one of said spaced points in contact with the other element; and then compressing the mechanism a number of times to flatten out said elevated portions to provide a wider area of contact with the cooperating contacting element.

6. The herein described process of insuring the accurate fitting of the parts of a friction shock absorbing mechanism, comprising the following steps: forming a friction shell with interior, inwardly converging friction surfaces; forming a plurality of friction shoes with friction surfaces and wedge faces, the friction surfaces thereof being adapted to co-operate with said shell surfaces; forming a pressure transmitting wedge with faces adapted to contact with said shoe faces; providing one of each of the co-acting sets of faces of the shoes and wedge with a convex contour; providing said convex faces with projections; assembling the parts; and then successively compressing the mechanism to flatten down said last named faces.

7. In a friction shock absorbing mechanism, the combination with a friction system including a plurality of elements having inter-engaging sets of wedge faces, one face of each set being flat and the other face of each set being provided with protrusions adapted to be flattened out after the parts have assumed a predetermined relative position to effect true surface contact thereof; of pressure transmitting means co-operating with said elements; and spring means opposing movement of said elements.

In witness that I claim the foregoing I have hereunto subscribed my name this 19th day of December, 1923.

WILLIAM A. GEIGER.